US012676069B2

(12) United States Patent
Rubio Mota et al.

(10) Patent No.: US 12,676,069 B2
(45) Date of Patent: Jul. 7, 2026

(54) LEG TYPE ENTRY ON FLIGHT MANAGEMENT SYSTEM

(71) Applicant: THE BOEING COMPANY, Arlington, VA (US)

(72) Inventors: David Rubio Mota, Madrid (ES); Maxim Constantijn Vos, Madrid (ES); Daniel Ramiro Rebollo, Madrid (ES)

(73) Assignee: The Boeing Company, Arlington, VA (US)

( * ) Notice: Subject to any disclaimer, the term of this patent is extended or adjusted under 35 U.S.C. 154(b) by 62 days.

(21) Appl. No.: 18/749,895

(22) Filed: Jun. 21, 2024

(65) Prior Publication Data

US 2025/0391279 A1 Dec. 25, 2025

(51) Int. Cl.
*G08G 5/21* (2025.01)
*G08G 5/32* (2025.01)

(52) U.S. Cl.
CPC ................. *G08G 5/21* (2025.01); *G08G 5/32* (2025.01)

(58) Field of Classification Search
CPC .................................. G08G 5/21; G08G 5/32
USPC .......................................................... 701/120
See application file for complete search history.

(56) References Cited

U.S. PATENT DOCUMENTS

| | | | | |
|---|---|---|---|---|
| 12,014,638 | B2 | 6/2024 | Geng et al. | |
| 2003/0088360 | A1* | 5/2003 | Ikhlef | G05D 1/0202 701/533 |
| 2006/0005147 | A1* | 1/2006 | Hammack | G01C 23/00 715/855 |
| 2007/0233331 | A1 | 10/2007 | Caillaud | |
| 2016/0163201 | A1* | 6/2016 | Le Merrer | G06Q 10/047 701/4 |
| 2016/0180718 | A1* | 6/2016 | Shapiro | G08G 5/21 701/418 |

OTHER PUBLICATIONS

Extended European Search Report for European Application No. EP25182948.7 dated Nov. 3, 2025, 9 pages.

* cited by examiner

*Primary Examiner* — Isaac G Smith
(74) *Attorney, Agent, or Firm* — Harrity & Harrity, LLP

(57) ABSTRACT

The present disclosure relates to an FMS configured to accept a plurality of flight legs (beyond the standard five) for consideration when developing a flight plan. Allowing an FMS to receive a plurality of flight legs, beyond just five, is achieved by calculating a lateral trajectory and a vertical trajectory based on the current state of the flight path. This may be done mid-flight or initially when a given flight plan is entered by the pilot. The sequence of leg types that are entered may be used to generate a predicted final trajectory and output a GUI (graphical user interface) of the predicted final trajectory.

20 Claims, 10 Drawing Sheets

| LEG CODE | EXAMPLE PATH |
|---|---|
| LEG 1 |  |
| LEG 2 |  |
| LEG 3 |  |
| LEG 4 |  |
| LEG 5 |  |

<table>
<tr><th>LEG CODE</th><th>EXAMPLE PATH</th></tr>
<tr><td>LEG 12</td><td>
</td></tr>
<tr><td>LEG 13</td><td>
</td></tr>
<tr><td>LEG 14</td><td>
</td></tr>
<tr><td>LEG 15</td><td>
</td></tr>
</table>

135

| PREVIOUS LEG | NEXT LEG A | NEXT LEG B | NEXT LEG C | NEXT LEG D | NEXT LEG E | NEXT LEG F | NEXT LEG G |
|---|---|---|---|---|---|---|---|
| A | x | y | x | z | q | x | x |
| B | z | v | y | q | y | x | y |
| C | z | z | z | z | z | z | z |
| D | y | q | y | x | q | q | v |
| E | x | y | z | q | u | v | v |
| F | v | x | z | q | u | y | x |
| G | x | y | z | q | u | v | q |

| TRANSITION TYPE VALUE | TRANSITION TYPE DESCRIPTION |
|---|---|
| x | TRANSITION NOT SUPPORTED |
| y | FLY BY TRANSITION |
| z | OVERFLY TRANSITION |
| u | OVERFLY WITH COURSE DEFINED |
| v | HOLD |
| q | TRANSITION THAT IS NOT REQUIRED |

FIG. 5

LEG TYPE ENTRY ON FLIGHT MANAGEMENT SYSTEM

FIELD

Aspects of the present disclosure relate to legs used to develop flight plans and, in particular, a pilot's ability to enter a plurality of legs to develop a flight plan.

BACKGROUND

A flight management system (FMS) is a sophisticated avionics system found in modern aircrafts. It handles tasks such as flight planning, navigation, and aircraft control, among many others. It may integrate various data from various sources to ensure safe and efficient flight operations. The FMS may be controlled through a Control Display Unit (CDU) from the cockpit. Additionally, data inputs can also be uplinked to the FMS. Uplinking data inputs to the FMS refers to the process of transmitting flight related information from an external source (such as an airlines operations center or a ground based communications system) directly to the FMS. This helps reduce the need for manual entry of certain data. The CDU may incorporate a small keyboard or touchscreen, allowing a pilot to enter and receive information pertinent to the flight plan.

In a flight plan, legs refer to individual segments that define the route an aircraft will follow from departure to arrival. Each leg represents a specific portion of a flight path. Legs may be defined by coordinates or other navigational aids. Each leg is of a specific type. Leg types in a flight plan categorize the different segment of a route based on characteristics such as distance, operational considerations, and airspace factors, among others. Leg types may include legs used for non-stop routes, legs used for flights with layovers, legs used for flights of a particular distance, etc. To define a leg of a certain type in a flight plan, variables such as navigational aids may be considered.

SUMMARY

One embodiment herein is a method that includes receiving, at a control display unit (CDU) of a flight management system (FMS), a sequence of a plurality of legs for a flight plan; determining whether a type of each of the plurality of legs is compatible with a type of a respective previous leg in the sequence; responsive to determining the plurality of legs in the sequence is compatible: determining a lateral trajectory based on the sequence; determining a vertical trajectory based on the sequence; generating a final trajectory of the flight plan based on the lateral and vertical trajectories; and transmitting for display, at the CDU, a graphical user interface (GUI) comprising a visual representation of the final trajectory.

Another embodiment herein is a system. The system includes: a control display unit (CDU) of a flight management system (FMS), and a flight management computer (FMC) of a FMS. The CDU is configured to: receive a sequence of a plurality of legs for a flight plan; and output a graphical user interface (GUI) comprising a visual representation of the final trajectory. The FMC is configured to configured to: determine whether a type of each of the plurality of legs is compatible with a type of a respective previous leg in the sequence; responsive to determining the plurality of legs in the sequence is compatible: determine a lateral trajectory based on the sequence; determine a vertical trajectory based on the sequence; and generate a final trajectory of the flight plan based on the lateral and vertical trajectories.

Another embodiment herein is a computer-readable storage medium having computer-readable program code embodied therewith. The computer-readable program code executable by one or more computer processors to: receive, at a CDU of an FMS, a sequence of a plurality of legs for a flight plan; determine whether a type of each of the plurality of legs is compatible with a type of a respective previous leg in the sequence; responsive to determining the plurality of legs in the sequence is compatible: determine a lateral trajectory based on the sequence; determine a vertical trajectory based on the sequence; generate the final trajectory of the flight plan based on the lateral and vertical trajectories; and transmit for display, at the CDU, a graphical user interface (GUI) comprising a visual representation of the final trajectory.

BRIEF DESCRIPTION OF THE DRAWINGS

So that the manner in which the above recited features can be understood in detail, a more particular description, briefly summarized above, may be had by reference to example aspects, some of which are illustrated in the appended drawings.

FIG. 5 depicts a matrix storing transition type values.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
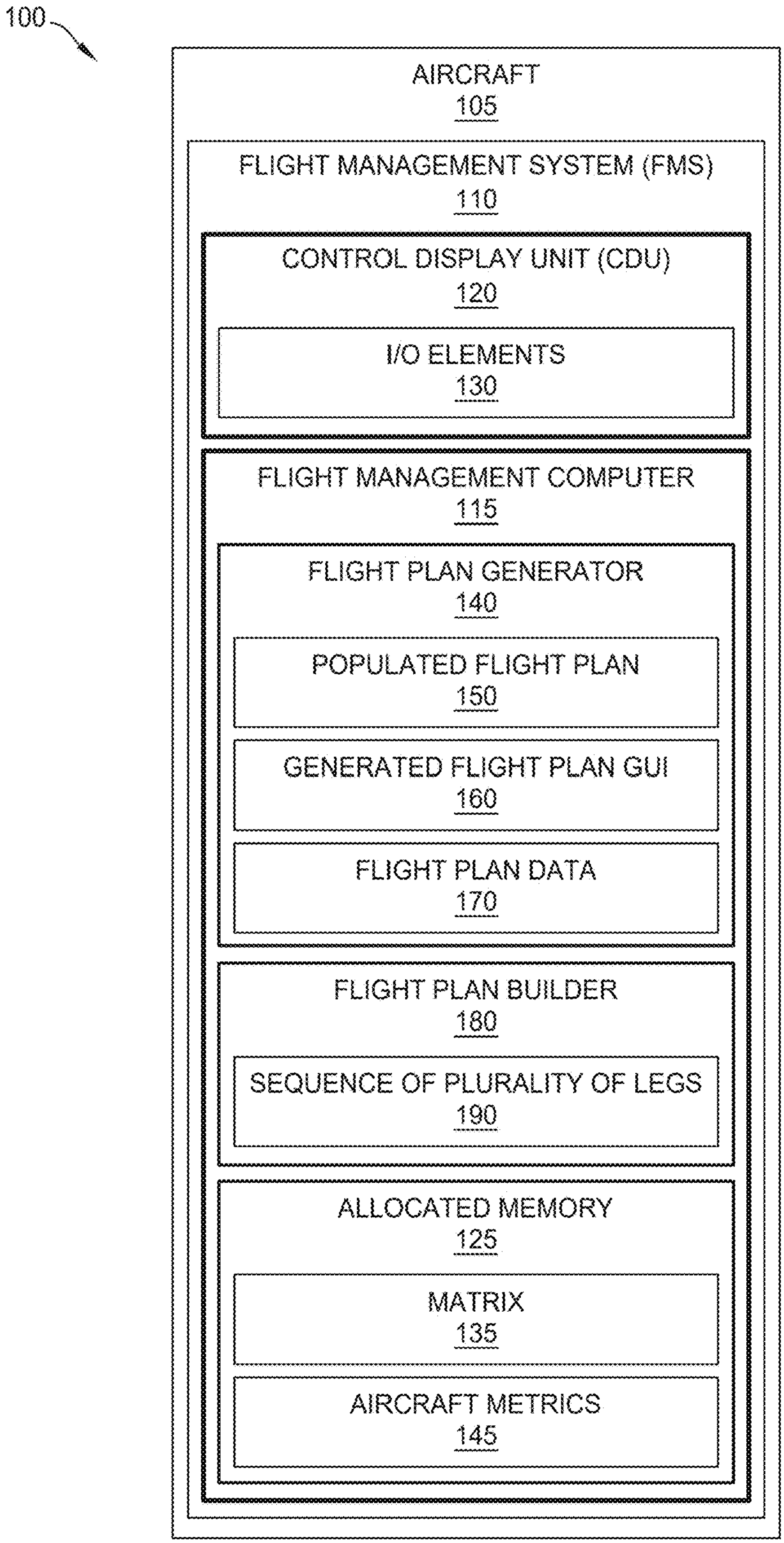
FIG. 1 depicts a block diagram of a flight plan generating system.

The present disclosure relates to a flight management system that allows a pilot to construct a flight plan using a plurality of legs. A flight plan refers to the route that an aircraft may follow for a particular flight. The plurality of legs used may be entered into the FMS through the CDU. Historically, FMSs have been configured to allow very few leg types and their combinations to be manually entered (e.g., less than five). Reasons for this include but are not limited to other legs being too complicated to implement into a flight plan at the stage where they are entered or they may involve more calculations or input than a current flight management system may facilitate. In the event the pilot may wish to modify the flight plan mid-flight, he may have limited flexibility with the limited options of leg types to choose from. Furthermore, some FMS solutions only enable pilots to manually enter a limited number of legs (less than five) that can easily connect to one another (the CDU does not use more inputs outside of the waypoints/legs to connect them), and preconfigured procedures. The preconfigured procedures can contain more advanced leg types (beyond the typical five or less). However, since these procedures are preconfigured in a database, the pilot only has to enter the name of the procedure and does not have to enter headings, altitudes, etc. That latter was already done outside the FMS when the procedure was configured in a database loaded on the FMS. However, there are benefits in providing a greater number of flight paths to pilots by offering more leg type options for entry.

The present disclosure relates to an FMS that accepts a plurality of flight legs (beyond the typical five or less) for consideration when developing a flight plan. In the event a pilot wants to modify a flight plan mid-flight, she now has more options to choose from. This may provide greater adaptability or flexibility during unexpected events. In one aspect, allowing a FMS to receive many different types of flight legs is achieved using stored values from a matrix that determines possible transition types between the many different types of legs. These transition types consider different data from a previously entered leg for calculating a lateral trajectory and a vertical trajectory that is either possible of impossible based on the current state of the flight path. Another aspect of developing a flight plan can involve airlines uplinking flight plans to the FMS. This can be done either before takeoff or during flight. These uplinked flight plans have the same limitations: limited leg types or preconfigured procedures. An uplinked flight plan from an airline operations center involves transmitting a flight plan to an FMS via data communication links. This process automates the transfer of flight information such as but not limited to routing, waypoints, altitudes, and speeds, based on current weather conditions, and air traffic control constraints, among other things.

Waypoint by waypoint processing of the flight plan can also be a capability of the FMS. The FMS can sequentially manage each waypoint along a planned route. As an aircraft progresses, the FMS can monitor the aircraft's position relative to the next waypoint, ensuring accurate navigation. The FMS can adjust its course, speed and altitude according to the flight plan. The sequence of leg types that are entered may be used to generate a flight plan and output a GUI (graphical user interface) of the flight plan.

In the current disclosure, reference is made to various aspects. However, it should be understood that the present disclosure is not limited to specific described aspects. Instead, any combination of the following features and elements, whether related to different aspects or not, is contemplated to implement and practice the teachings provided herein. Additionally, when elements of the aspects are described in the form of "at least one of A and B," it will be understood that aspects including element A exclusively, including element B exclusively, and including element A and B are each contemplated. Furthermore, although some aspects may achieve advantages over other possible solutions and/or over the prior art, whether or not a particular advantage is achieved by a given aspect is not limiting of the present disclosure. Thus, the aspects, features, aspects and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects described herein may be embodied as a system, method or computer program product. Accordingly, aspects may take the form of an entirely hardware aspect, an entirely software aspect (including firmware, resident software, micro-code, etc.) or an aspect combining software and hardware aspects that may all generally be referred to herein as a "circuit," "module" or "system." Furthermore, aspects described herein may take the form of a computer program product embodied in one or more computer readable storage medium(s) having computer readable program code embodied thereon.

Program code embodied on a computer readable storage medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to aspects of the present disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various aspects of the present disclosure. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order or out of order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

While the foregoing is directed to aspects of the present disclosure, other and further aspects of the disclosure may be devised without departing from the basic scope thereof, and the scope thereof is determined by the claims that follow.

FIG. 1 is a block diagram of a system 100 within an aircraft 105. The FMS 110 of the system 100 is configured to receive and implement a plurality of leg types for generating a flight plan. As shown, the FMS 110 includes a CDU 120, and a flight management computer 115. The CDU 120 includes I/O elements 130 (e.g. buttons, toggles, switches, touchscreen capabilities, a keyboard, etc.). The flight management computer (FMC) 115 includes a flight plan generator 140, which includes a populated flight plan 150, a generating flight plan GUI 160, and flight plan data 170. Also included in the FMC 115 is a flight plan builder 180, which includes a sequence of a plurality of legs 190 entered by the pilot. Also included in the FMC 115 is allocated memory 125, within which is a matrix 135 and data of aircraft metrics 145.

The CDU 120 serves as an interface between the pilot and the FMS 110. It is a display unit that provides I/O elements 130, enabling a pilot to instruct the FMS 110. Upon processing the provided instructions, the FMS 110 may be responsible in part for the physical movement of the aircraft 105. The CDU may include a display that enables a pilot to interact with performance or system management functions. The I/O elements 130 enables these interactions allowing entry of flight plan information, selected waypoints, among other means.

The integration of the CDU 120 having I/O elements 130, with the FMS 110 allows the pilot to also be informed of information regarding the aircraft's navigation status, among other things. I/O elements 130 may be disposed in the same location as the CDU 12 itself, or elsewhere in the cockpit of the aircraft 105. In either aspect, I/O elements 130 allow communication with the FMS 110 through the CDU 120.

The flight plan generator 140 is an element within the FMS 110 that generates a flight plan based in part on the inputs provided to the FMS 110, via the CDU 120. The flight plan generator 140 may be software, firmware, hardware or a combination thereof within the FMS 110 to process data for generating flight plans for the aircraft 105.

One element included in generating a flight plan, within the flight plan generator 140, is the populated flight plan 150. The populated flight plan 150 may be a flight plan filled with details regarding the flight, enabling a completed flight plan to be generated. Such details may come from the flight plan data 170. The flight plan data 170 may include details such as the origin airport, or the airport where the aircraft 105 departs from, the destination airport, the planned route, expected departure times and arrival times, and information regarding legs of the flight plan, among other pieces of information that may be relevant.

The flight plan data 170 may include data from various sources such as weather data, airline specific procedures that may affect the flight, traffic control restrictions, among other data that could affect the flight plan. Once populated with information, the populated flight plan 150 of the flight plan generator 140 may help generate the flight plan for the aircraft 105.

The sequence of plurality of legs 190 is used by the flight plan builder 180 for the above referenced customization.

Flight legs refer to individual segments or sections of a flight plan. The sequence of the plurality of legs 190 may represent the combination of defined leg types entered by the pilot for generating the flight plan. In one example, each leg of the sequence of plurality of legs 190 represents a segment of the flight plan between two navigational aids. There are different types of legs that may be defined in a flight plan. This concept will be further discussed with FIG. 4. A plurality of legs may be defined in a flight plan using information from the previously entered leg. This concept will be further discussed in FIG. 3. Flight legs may help to track flights segment by segment. Flight legs may be used by pilots to navigate along a planned route from waypoint to waypoint, fix to fix, or between other navigational aids.

Waypoints refer to geographic locations defined by latitude and longitude coordinates. They may be used to define points along a flight path from leg to leg. Waypoints may be defined arbitrarily, or by landmarks, airway intersection points, etc.

Fixes refer to specific points in an airspace that may be identified by geographic coordinates, or other navigational aids. They may serve as reference points for defining airways, and may be used as points for defining legs in a flight plan. Unlike waypoints, fixes may have standardized names or designations recognized by an aviation authority and are not defined arbitrarily.

Also within FMS 110 is the flight management computer 115. The flight management computer 115 is a computer within the FMS 110, which stores a matrix 135 and aircraft metrics 145 within its allocated memory 125, a flight plan generator 140, and a flight plan builder 180, among other things. The matrix 135, which will be discussed in further detail in FIG. 5, along with the aircraft metrics 145, may be used by the flight plan generator 140, as within plan data 170 to ultimately generate the flight plan.

The flight plan generator uses the information from the flight plan builder, as described above, to visually display the flight plan using the flight plan GUI 160. The generated flight plan GUI may be a user interface designed to show the layout of the flight plan. It may provide a visual representation of the flight plan such that it can be understood and interpreted via a GUI. Examples of this can include but are not limited to, the flight plan displayed as a list of legs, a 2-D map, or other displaying possibilities. In one aspect, the flight plan GUI 160 is displayed simultaneously with determining a flight plan. Another aspect may display the flight plan GUI 160 after a flight plan is determined from information it is populated with.

The flight plan builder 180 may be used for generating a flight plan by the flight plan generator 140. The flight plan builder 180 is a tool within the FMS 110 that may allow a pilot to manually construct or customize the flight plan. This customization may be through selecting routes, airways, or other more variable parameters. The flight plan builder may provide a pilot more control and flexibility in tailoring the flight plan to specific preferences.

Figure 2:
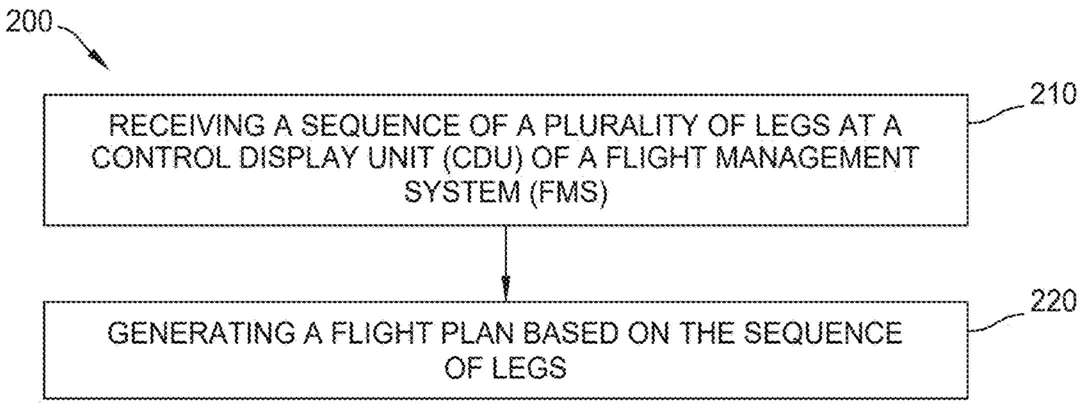
FIG. 2 depicts a flowchart for generating a flight plan.

FIG. 2 shows a flowchart 200 for generating a flight plan.

At block 210, the CDU 120 receives a sequence of a plurality of legs 190. The sequence can be received as it is manually entered by the pilot, or the legs can be received as uplinked elements of the flight plan. Uplinking involves the FMS 110 obtaining segments, such as legs, for a flight plan via data communication systems, or from somewhere other than manual input. If legs are uplinked, the waypoints, altitudes and speed constraints, among other things, can also be uplinked. Uplinking legs from an airline's operation center can involve transmitting specific legs of a flight plan directly to the aircraft's FMS 110 using communications systems. As the legs are uplinked, information that can be used to define the legs in the flight plan to generate a final trajectory can also be uplinked.

Figure 3:
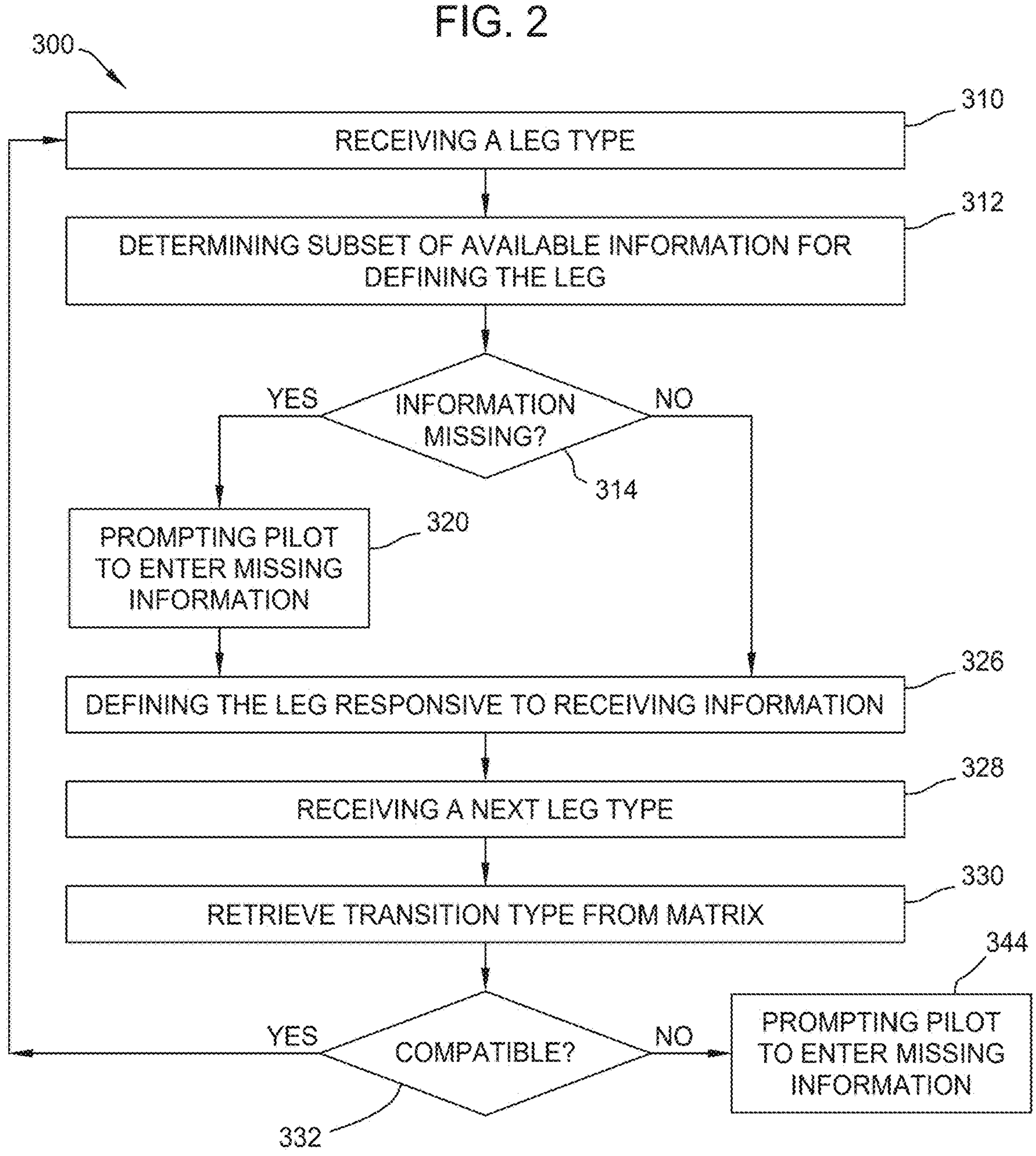
FIG. 3 depicts a flowchart for defining legs in a sequence.
Figure 4A:
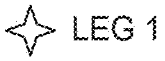
FIGS. 4A-4E depict images of leg types and leg type codes.
Figure 4A:
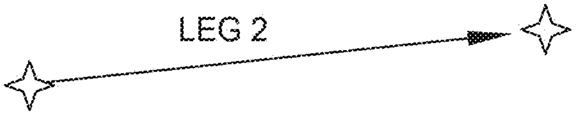
Figure 4A:
Figure 4A:
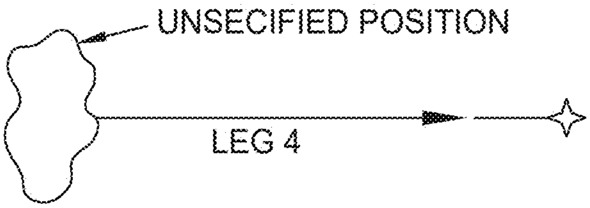
Figure 4A:
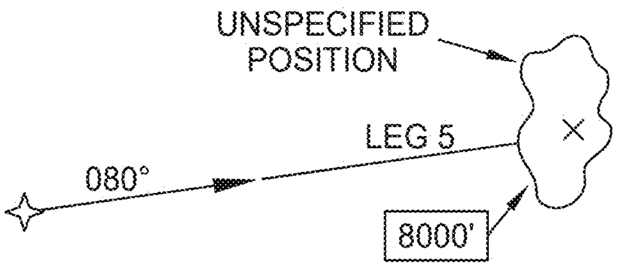
Figure 4B:
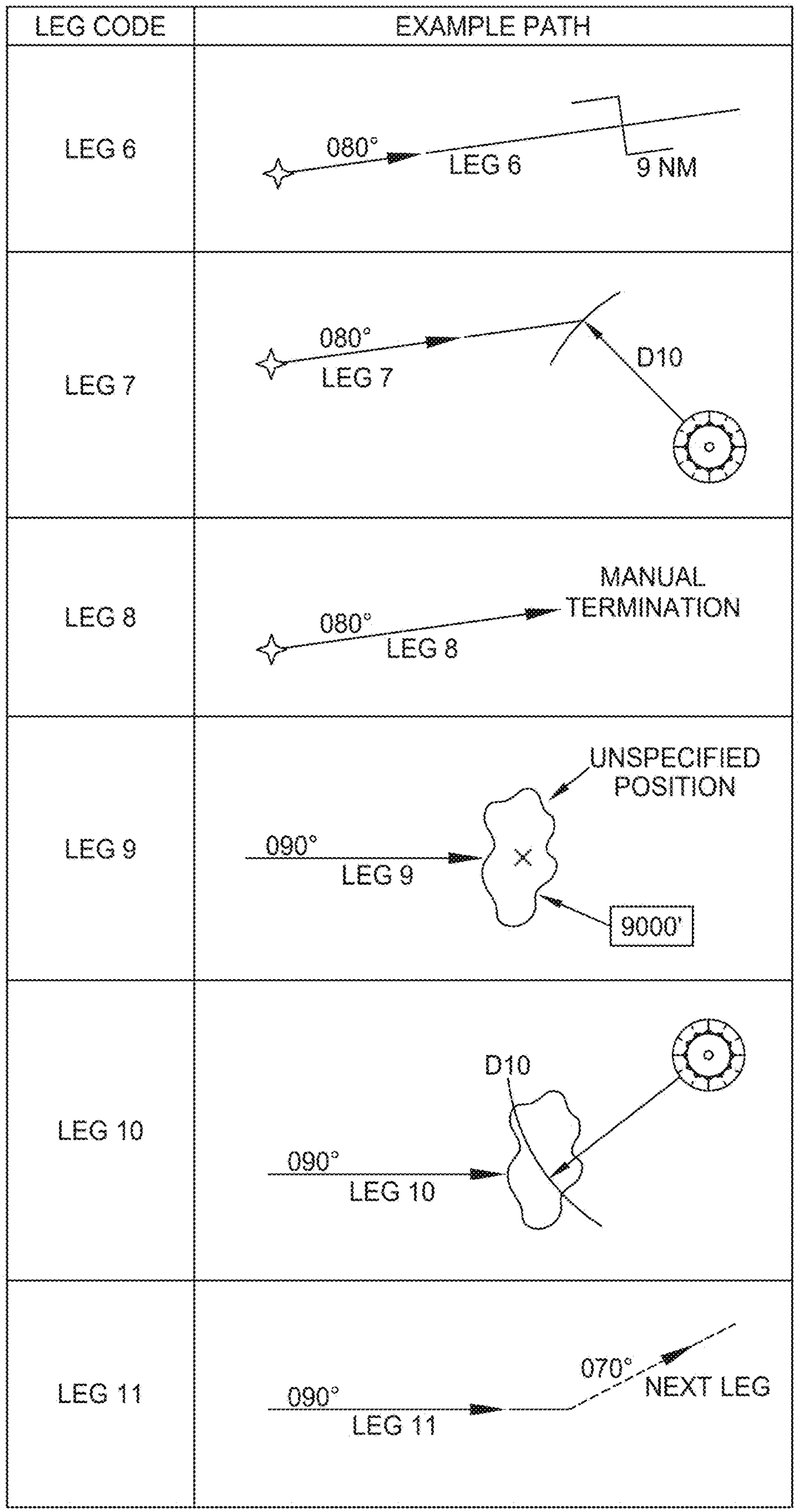
Figure 4C:
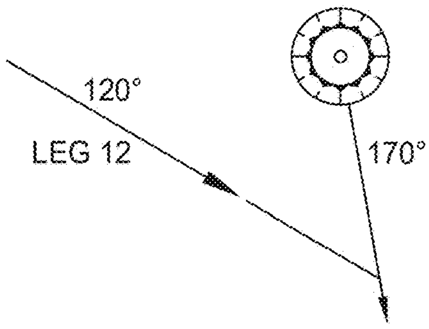
Figure 4C:
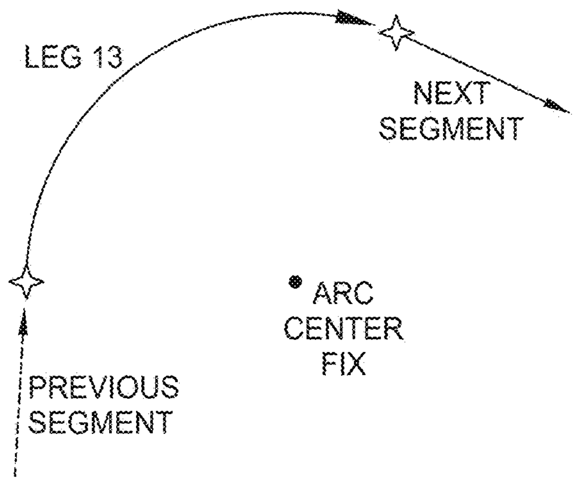
Figure 4C:
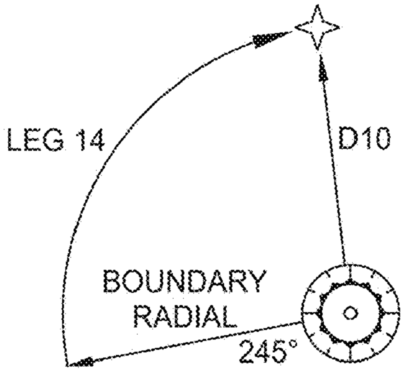
Figure 4C:
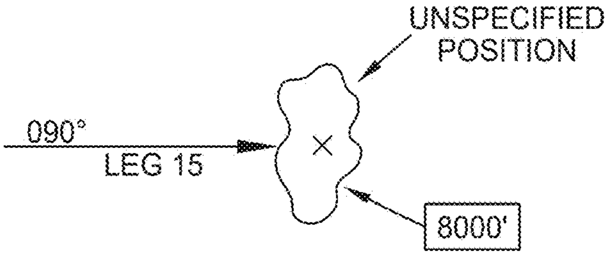
Figure 4D:
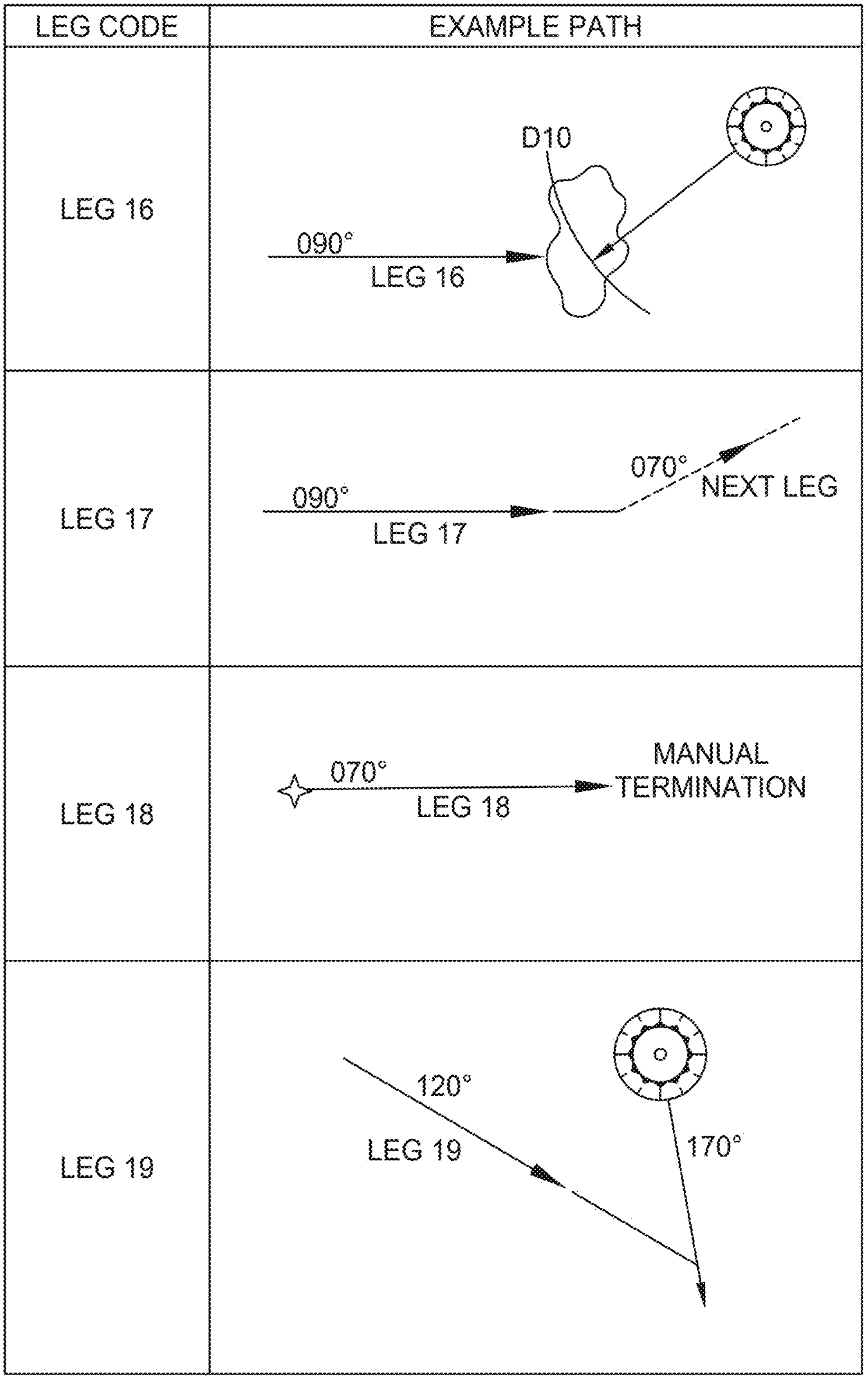
Figure 4E:
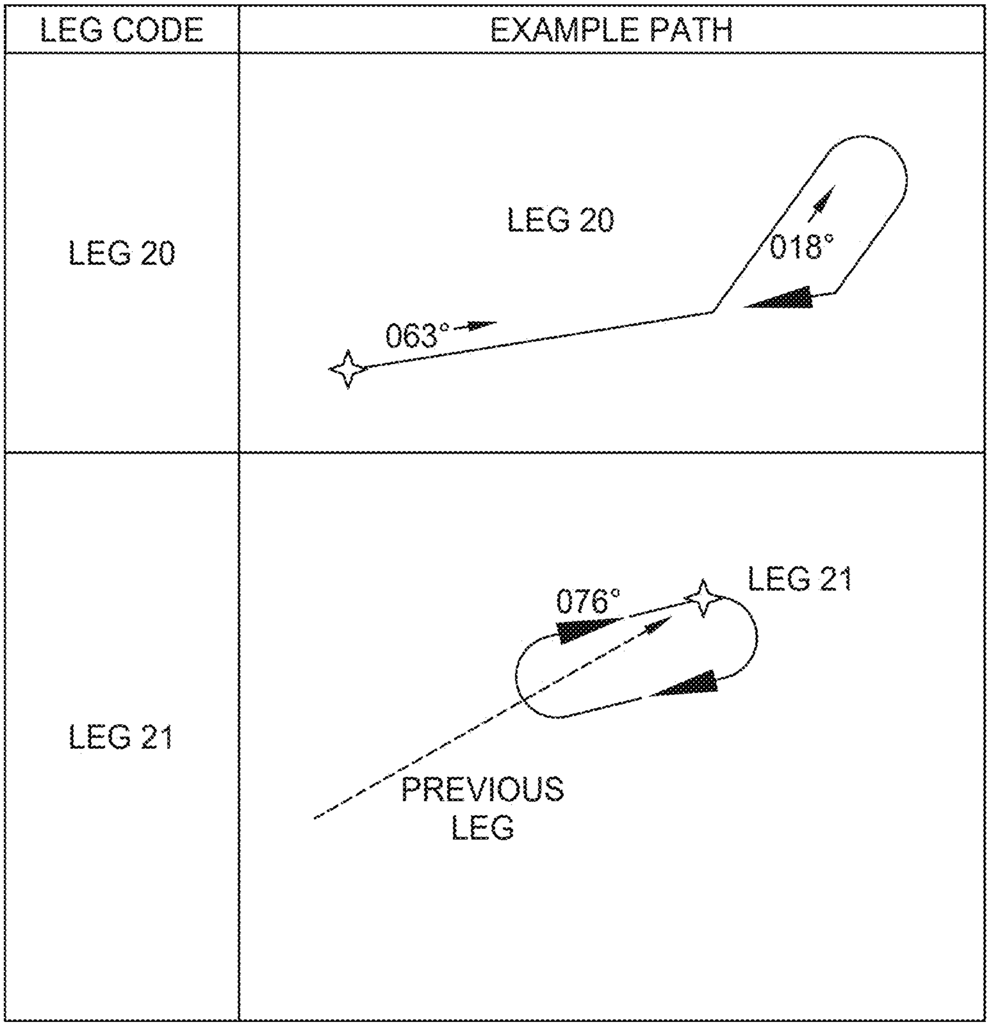

Generating this sequence of legs is described in detail in FIG. 3. The sequence of the plurality of legs 190 may be a plurality of compatible combinations that will be used to generate a flight plan, which can be governed using the matrix 135 in FIG. 1. The types of legs that may be used is further discussed in FIG. 4.

At block 220, the sequence of the plurality of legs 190 is used, among other data points, for generating a flight plan. The flight plan may be generated based on the legs that are defined in the sequence of the plurality of legs 190. The sequence of the plurality of legs 190 may be inputted at the CDU by the pilot. Information used to develop the flight plan may come from the leg types, the defined legs, the transitions between legs (which will be further discussed in FIG. 3), among other data that may be drawn from the sequence of plurality of legs 190. The details of performing block 220 are described in FIG. 6.

FIG. 3 depicts a flowchart 300 showing the sequence of plurality of legs 190 being defined. That is, the flowchart 300 is one example of performing block 210 of FIG. 2.

At block 310, the FMS 110 receives a leg type input at the CDU 120. The I/O elements 130 of the CDU 120 facilitate the pilot to enter this information. The first leg type entered in the sequence may be one of a plurality of options. One non limiting example may be that the first leg type entered by the pilot is an initial fix leg type. This leg type refers to the first segment of a flight plan after departure from the origin airport.

At block 312, the FMS 110 determines a subset of information available to the system from a previous leg in the flight plan that can be used to define a subsequent leg that was entered at block 310. However, if this is the first leg in the flight plan, then block 312 may be skipped since there is no previous leg. However, after the first leg has been added to the flight plan, then its information can be used to define the next leg in the flight plan, and so on as the pilot continues to add legs to the flight.

Defining a leg refers to the FMS 110 using various parameters that ground the entered leg type between navigational segments of a specific flight plan. For example, a leg may be defined by a specific navigational fix or waypoint, referred to as an initial fix. If an initial fix leg type is entered into the CDU at block 310, defining the leg at block 312 comprises marking the initial fix that is near the current aircraft position, thus, grounding the initial fix leg type in the specific flight plan. It may be located a short distance from the origin airport and may serve as an initial reference point for the rest of the flight plan to then be built off of. By defining legs, pilots may create a structured route for the aircraft to follow. It provides improvements in navigation, adherence to airspace restrictions, fuel efficiency and much more.

Determining a subset of available information to define the leg entered at block 310 comprises the FMS 110 determining what information the entered leg type should to be defined. Different leg types have different characteristics that are considered when looking to define them in a flight plan. A subset of available information to define the entered let type may be, but is not limited to, the starting fix or waypoint for which the leg may begin at, the planned altitude or speed the pilot may use for the leg, coordination with other air traffic, leg length, end fix or waypoint, etc. The subset of available information to define the entered leg type may automatically populate the respective fields of the FMS for defining the received leg type as a leg in the flight plan.

At block 314, the FMS determines if there is more information missing from its data pool that could be used to define the received leg type. A new leg is added to the sequence of plurality of legs 190, the FMS 110 may use information that is already available from a previously define leg to define this new leg at block 312. If there is information not attainable from the previously defined leg, the FMS 110 may prompt the pilot to enter such information at block 320. Requested information that is not yet accessible but can still be used to define a leg is information the pilot has yet to enter for the flight plan. This could be the same type of data that would otherwise be available, such as specified waypoints or fixes, planned altitude, planned speed, planned heading, or other additional parameters. If it determined that information is not missing, the flow moves to block 326. If it is determined that information is missing, the flow moves to block 320.

At block 320, the FMS prompts the pilot through the CDU to enter the missing information. For example, if a distance measuring equipment (DME) navigational aid is used by the leg, the pilot may be prompted at the CDU to enter the DME navigational aid and the distance to reach to the DME navigational aid. If the information is received, the flow moves to block 326.

At block 326, the FMS defines the leg type received at block 310 in the flight plan. Defining a leg in a flight plan adds the leg type to the flight plan for the aircraft 105. Defining a leg involves specifying the characteristics, parameters, and other relevant information of the segment the leg will be used for in the aircraft's 105 flight plan. Defining a leg type uses the information from the previous blocks 312 and 320. The pieces of information that may be included in those blocks are but are not limited to the start and end points, planned altitude during the segment of the flight that the leg will be used in, the planned speed of the aircraft during the segment of the flight that leg will be used in, course headings information, or any other leg specific data, such as restrictions that can be trigged by using the leg type. Course headings refer to the direction the aircraft flies in relative to true north or magnetic north.

At block 328, the FMS receives the next leg type. This next leg type follows the first defined leg of the flight plan and represents the next segment of the route. Subsequent entered legs follow in a similar manner, such that each leg defines a new segment of the flight plan until the aircraft 105 reaches its final destination. For the next entered leg to be defined, its compatibility with the previously defined leg is determined. This is done by the FMS retrieving information from a matrix stored in the flight management computer 115. The retrieved information determines whether or not the next entered leg type is compatible with the respective previous leg, or the previously defined sequence of legs. At block 330, the FMS retrieves this information from the matrix 135.

FIG. 5 will now be discussed, as it depicts one example of the matrix 135. FIG. 5 shows the matrix 135, stored within the allocated memory 125 of the flight management computer 115. The matrix 135 stores a value that represents the possible transition type(s) supported between two legs entered sequentially in a flight plan. The stored transition type value in the matrix 135 indicates whether the second leg is permitted after the first leg, or whether the third leg is permitted after the second leg, and so on. The stored transition type values in the matrix 135 communicates to the FMS 110 the way the entered legs can work together in a flight plan. For example, if the first leg entered is of type "C," and it becomes defined in the flight plan, and the next leg type entered is of type "F," the two legs sequentially are supported. The transition type that makes them possible in the flight plan is transition type value "Z" which refers to an overfly transition. However, if the respective previous leg of the sequence is of type "A" and the proceeding leg type entered to be defined is of type "F," the leg of type "F" would not be able to be defined in the flight plan, as the transition type value associated with an "AF" leg sequence is of value "X" which means that the transition type is not supported—i.e., those legs types are not compatible.

A fly by transition between two legs refers to a maneuver where an aircraft follows a predefined path along a route while maintaining its track. This transition is meant to ensure the aircraft smoothly transitions from one leg to the next without turning at the point where the start of the next leg occurs. The aircraft is meant to continue on its current track, effectively "flying by" a point before proceeding along to the next leg of the route. A fly by transition maintains course continuity.

An overfly transition between two legs refers to an aircraft passing over a predefined waypoint of fix without turning or deviating from its current course. Unlike a fly by transition where the aircraft crosses a predefined waypoint or fix and stays along the same path, an overfly transition guides the aircraft to cross over the waypoint or fix before proceeding to the next leg of the route.

An overfly with course defined transition refers to an aircraft flying directly over a waypoint or fix and then changing its course to align with the next segment of the route. For example, if a flight plan includes waypoint B and waypoint C, an overfly with course defined transition may instruct the aircraft to fly directly toward waypoint B. When the aircraft reaches waypoint B the aircraft should fly directly over it. After it passes waypoint B, the aircraft can then adjust its course to align with the heading that takes it to waypoint C.

A hold transition refers to a flight plan segment where an aircraft is directed to enter and maintain a holding pattern at a predetermined fix or waypoint. The holding pattern serves as an area for the aircraft to remain while awaiting further instructions from air traffic control. Hold transitions may be used as part of standard instrument departure/standard terminal arrival route (SID/STAR), providing a safe place for an aircraft to remain in a potentially congested airspace.

Sometimes between defined legs of a flight plan, a transition is not required. This means there is no maneuver or procedure used to connect two legs of a flight plan. This may occur when the two legs naturally flow into each other without the need for a distinct transition point or action. One non limiting example of this is when the flight plan involves flying from one waypoint directly to another waypoint along a straight line path, without turning or deviating from the straight line path. The aircraft would continue along the current track from one leg to the next without any additional maneuvers that would define a transition.

Other times, a transition from one leg to another leg type is not supported in a flight plan. This means there is no procedure that can connect the two legs together in a flight plan. This may happen if there are existing airspace or routing constraints that prevent the implementation of connecting the two leg types, if the navigation infrastructure in the FMS does not support a direct transition between the two legs, if airspace traffic or congestion does not deem a transition between the two leg types safe, or if the flight planning software in the FMS does not allow for the transition, among other reasons.

Within the matrix are values that represent the transition type the aircraft 105 uses as it transitions to a next leg in the flight plan. Using this matrix, the FMS determines whether or not the next leg entered is compatible with the previously defined leg in the flight plan. Examples of transition types are but are not limited to fly by transitions, overfly transitions, overfly with course defined transitions, hold transitions, and noting that a transition is not required, among others. If a transition between the previously defined leg and the next entered leg type is not compatible, the matrix 135 will communicate that a transition between the two is not supported. Or the GUI could proactively determine which legs are compatible with the current leg and only display the compatible legs as options for the next leg.

Returning to the flowchart 300, at block 332, the FMS processes the transition type value found in the matrix. The transition type value represents whether or not a transition is possible, and if it is possible, the type of transition that the flight plan will use between the legs. If it is determined that a transition between the previously defined leg of the flight plan and the next entered leg type is not possible, the flowchart 300 moves to block 344. At block 344 the FMS outputs via the CDU that the entered leg type is incompatible with the previously defined leg or previously defined sequence of legs. This means the pilot should enter in a different leg (or go back and change the previous leg to a leg that is compatible with the new leg). If at block 332, the FMS determines that the transition type value stored in the matrix 135 represents a compatible transition between leg types, the flow loops back to block 310 if another leg type is entered by the pilot. Each time a new leg is entered into the sequence, blocks 312 through 332 are repeated till the pilot no longer desires to add legs to the flight plan.

FIGS. 4A-4E depict non limiting examples of ARNIC-424 leg types that a pilot may enter into the FMS 110 that are supported in a flight plan. However, flight leg types outside of the ARNIC-424 leg types can also be used in the current aspects. A leg type can be entered into the FMS though the CDU using leg codes. Leg codes refer to alphanumeric codes representing different leg types.

One leg that may be included in a flight plan is an initial fix. An initial fix refers to a designated navigational point used as the starting point of a flight path.

Another leg that may be included is a track to fix leg. A track to fix leg defines a great circle track over ground between two known fixes. An aircraft follows a track from one designated fix to another designated fix along a predetermined path of the flight plan. Another leg that may be included in a flight plan is a course to fix leg. A course to fix leg defines a specified course to a specific fix. A course to fix specifies the intended direction toward a fix, regardless of external factors, such as wind. The difference between a track to fix and a course to fix leg is in the way the aircraft navigates toward the fix. Course to fix legs maintain a specific course toward the fix, whereas track to fix legs follow a track relative to ground based navigational aids. A course refers to the intended direction of a flight. It can be expressed as a magnetic course heading or a true course heading (the direction of the aircraft's nose, or the longitudinal axis of where the aircraft is pointing). They may be depicted on a navigation chart or displayed in an aircraft instrument.

Another leg that can be included in a flight plan is a direct to a fix leg. A direct to a fix leg defines an unspecified track starting from an undefined position to a specific database fix. The aircraft navigates to a specific fix or waypoint without following a predefined route, but along a straight line path. Direct routing may be used when the pilot desires a direct route between two points and such direct routing is authorized.

Another flight leg is a fix to an altitude. A fix to an altitude refers to a track over ground to a fix to an unspecified position. A fix to an altitude leg encompasses the concept of transitioning from navigating toward a fix to reaching a specific altitude. The fix to an altitude leg begins at a fix and ends at a certain altitude.

Another leg that may be included in a flight plan is a track from a fix for a distance leg. A track from a fix for a distance leg defines a certain track over ground from a database fix for a certain distance. A track from a fix for a distance leg refers to a segment of the flight plan where the aircraft flies along a defined track from a fix for a predetermined distance till the aircraft reaches the starting point for the next leg or segment of the flight plan.

Another leg that may be included in a flight plan is a track from a fix to a distance DME distance leg, which defines a certain track over ground from a fix to a certain DME distance. The DME distance refers to a distance calculated by a DME navigational aid. The track from a fix to a DME distance leg, as opposed to a track from a fix for a distance leg, uses the DME to determine the distance of the leg. The difference between the two lies in how the endpoint of the leg is determined.

Another leg that may be included in a flight plan is a from a fix to manual termination leg. A from a fix to manual termination leg defines a certain track over ground from a database fix until the leg is manually terminated. A from a fix to a manual termination leg refers to a flight plan segment where the aircraft navigates from a designated fix to a point where manual control of the aircraft may be resumed. This may be for the purpose of the pilot wishing to land the aircraft, among other reasons. A from a fix to manual termination leg allows a smooth transition from automated navigation of the aircraft to manual piloting of the aircraft.

Another leg that may be used in a flight plan is a course to an altitude leg. A course to an altitude leg defines a certain course to a certain altitude at an unspecified position. A course to an altitude leg involves navigating the aircraft along a course while the aircraft climbs to an endpoint of a certain altitude. The altitude the aircraft is climbing to may be defined in many ways, included in feet above sea level, or flight level.

Another leg that may be used in a flight plan is a course to a DME distance leg. A course to a DME distance leg defines a certain course to a certain DME distance. A course to a DME distance leg refers to a segment of the flight plan where the aircraft follows a certain course, and the leg ends once a predetermined distance measured by a DME station is reached. A course to a DME leg helps improve navigation toward the end point of the leg as it provides distance information that improves the situational awareness of the aircraft as it navigates along the flight plan.

Another leg that may be used in a flight plan is a course to an intercept leg. A course to an intercept leg defines a certain course to incept a subsequent leg. A course to an intercept leg refers to a flight plan segment where the aircraft is directed to fly a specific course with the intention of intercepting another course. It may be used to transition from one route to another at an intercept point. An intercept point is the location where the aircraft is expected to intersect the desired course. The interception at that interception point may involve the pilot making adjustments to the aircraft, such as changing the aircraft's course heading, altitude, speed, etc. A course to intercept leg helps the aircraft safely transition between different segments of a flight plan while maintaining a safe distance from other air traffic by incorporating certain interception points.

Another leg that may be used in a flight plan is a course to a radial termination leg. A course to a radial termination leg defines a course to a certain radial from a certain database very high frequency omni-directional radial range (VOR) navigational aid. A VOR navigational aid is a ground based navigation system used to determining the aircraft's position along predetermined routes. It works as a VOR station emits two signals. One signal is variable phase signal that rotates around the VOR station in all directions, and a reference phase signal that points north. The timing or alignment difference of the radial signals is determined and used for determining the position of the aircraft. A course to a radial termination leg refers to a segment of a flight plan where the aircraft is directed to fly a certain course with the intention of intercepting and then following a designated radial from a VOR navigational aid until reaching a predefined end point of the leg. A course to a radial termination leg combines navigation based on a desired course with tracking along a radial to an end point of the leg. A course to a radial termination leg begins at a starting point, and flies a certain course toward a VOR station. As the VOR station approaches, certain adjustments may be made such that the desired radial can be intercepted. Upon intercepting the desired radial, the aircraft may move along that radial until reaching a predefined end point of the leg.

Another leg that may be used in a flight plan is a constant radius arc leg. A constant radius arc leg defines a constant radius turn between two fixes, lines tangent to the arc and a center fix. While the arc initial point, arc ending point, and arc center point are all available as fixes, implementation of this leg type may not have them as available fixes. A constant radius arc leg refers to a segment of a flight plan where the aircraft follows a curved path with a constant radius about a certain point. A constant radius arc leg may be used during instrument approaches. As the leg begins at a starting point, the aircraft navigates along a path around a center point, such that the path it moves along is curved throughout its course.

Another leg that may be used in a flight plan is an arc to a fix leg. An arc to a fix leg defines a track over ground at a certain constant distance from a DME navigational aid. An arc to a fix leg refers to a flight plan segment where the aircraft follows a curved path with a constant radius around a certain point until it reaches a designated end point. It may be used as a flight plan transitions from a curve path to a straight line path. The arc to a fix leg begins at a starting point and navigates along a curved path until it reaches an endpoint. As opposed to a constant radius arc leg, an arc to a fix leg may have varying radii throughout the leg rather than just one constant radius.

Another leg that may be used in a flight plan is a heading to an altitude termination leg. A heading to an altitude termination leg defines a certain heading to a specific altitude at an unspecified position. A heading to an altitude termination leg refers to a segment of a flight plan where the aircraft is directed to fly a certain heading until reaching a predetermined altitude, at which the segment terminates. A heading to an altitude leg begins at a starting point where the aircraft proceeds to follow a certain heading. As the aircraft moves along the heading, the altitude of the aircraft is monitored so that it reaches the termination point of the leg at the correct altitude in the correct location. The FMS 110 predicts where the aircraft 105 may reach the altitude, and the FMS 110 can sequence the waypoint once the altitude is reached. In actuality, this may be earlier or later than predicted. A heading to an altitude termination may be used during climb phases of a flight plan, step climb phases, step decent phases, or decent phases of a flight plan.

Another leg that may be used in a flight plan is a heading to a DME distance termination leg. A heading to a DME distance termination leg defines a certain heading terminating at a certain DME distance from a certain database DME navigational aid. A heading to a DME distance termination leg refers to a flight plan segment where the aircraft is directed to fly a certain heading until it reaches a predetermined distance from a DME station at which the leg terminates. A heading to a DME distance termination leg begins at a starting point where the aircraft proceeds to follow a certain heading. As the aircraft flies along this heading, it monitors the distance between the aircraft and the DME station where it is supposed to terminate. Once the aircraft reaches the predefined DME station, the leg terminates.

Another leg that may be used in a flight plan is a heading to an intercept leg. A heading to an intercept leg defines a certain heading to intercept the subsequent leg at an unspecified position. A heading to an intercept leg refers to a segment of a flight plan where the aircraft is directed to fly a certain path without a predetermined endpoint or termination criteria. A heading to an intercept leg provides flexibility for air traffic control and pilots to adjust the trajectory of the aircraft as seen fit. A heading to an intercept leg is commonly used when such flexibility is beneficial for accommodating for changing traffic patterns or airspace constraints.

Another leg that may be used in a flight plan is a heading to a manual termination leg. A heading to a manual termination leg defines a certain heading until a manual termination. A heading to a manual termination leg refers to a flight plan segment where an aircraft is directed to fly a certain heading until it receives instruction for manual control of the aircraft, which terminates the leg. Once manual control of the aircraft is resumed, the pilot may take over control of the heading of the aircraft. A heading to a manual termination leg may be used when visual contact with a runway is established during the landing phase of a flight plan.

Another leg that may be used in a flight plan is a heading to radial termination leg. A heading to radial termination leg defines a certain heading to a certain radial from a certain VOR navigational aid. A heading to radial termination leg refers to a flight plan segment where an aircraft is directed to fly a certain heading until intercepting and then following a designated radial from a VOR until reaching a predetermined termination point. A heading to radial termination leg begins at a point where it follows a heading for an aircraft to fly. As the aircraft flies along the heading, it is monitored to determine when it will reach the predetermined radial it is flying toward. Once the aircraft reaches and intercepts the predetermined radial, the aircraft flies along that radial until reaching the predetermined termination point of the leg.

Another leg that may be used in a flight plan is a procedure turn leg. A procedure turn leg defines a course reversal starting at a certain fix that includes an outbound leg followed by a left or right turn and a 180 degree course reversal to intercept the next leg. A maximum excursion time of distance is included as a data field for this leg. A procedure turn leg refers to a flight plan segment that aligns the aircraft with a final approach course that involves a predetermined maneuver designed to reposition the aircraft for landing with approaching a runway. A procedure turn leg is configured to begin at an initial fix, from which it is executed to reposition the aircraft for a final approach, involving a 180 degree turn.

Another leg that may be used in a flight plan is a hold in lieu of procedure turn for approach procedures and mandatory holds in SID/STAR and missed approach coding. A SID and STAR are standardized procedures used by pilots and traffic control to facilitate air traffic arrivals and departures. A SID is a published departure procedure that provides a predefined route for an aircraft to follow after takeoff from an airport. A SID is designed to ensure safety and includes instructions that may involve the use of particular headings, altitudes, waypoints, etc. to be followed by pilots during the initial phase of a flight after departure. A STAR is a published arrival procedure that provides a predefined route for an aircraft to follow when approaching an airport for landing. A hold in lieu of procedure turn for approach procedures and mandatory holds in SID/STAR and missing approach coding refers to a predefined holding pattern that an aircraft enters and maintains as part of the procedure. The different path termination types that can be used in this leg include an altitude termination, a single circuit terminating at the fix, and a manual termination.

The above legs can be entered and defined within a flight plan of the aircraft 105. The sequence that they are compatible, or the order that they can be presented is determined, in part, by the transition type that is supported between one defined leg and a next leg type. In one aspect, the supported leg types may include the leg types defined by the ARNIC 424 standard, which is a data format used to define a wide range of navigational data.

Figure 6:
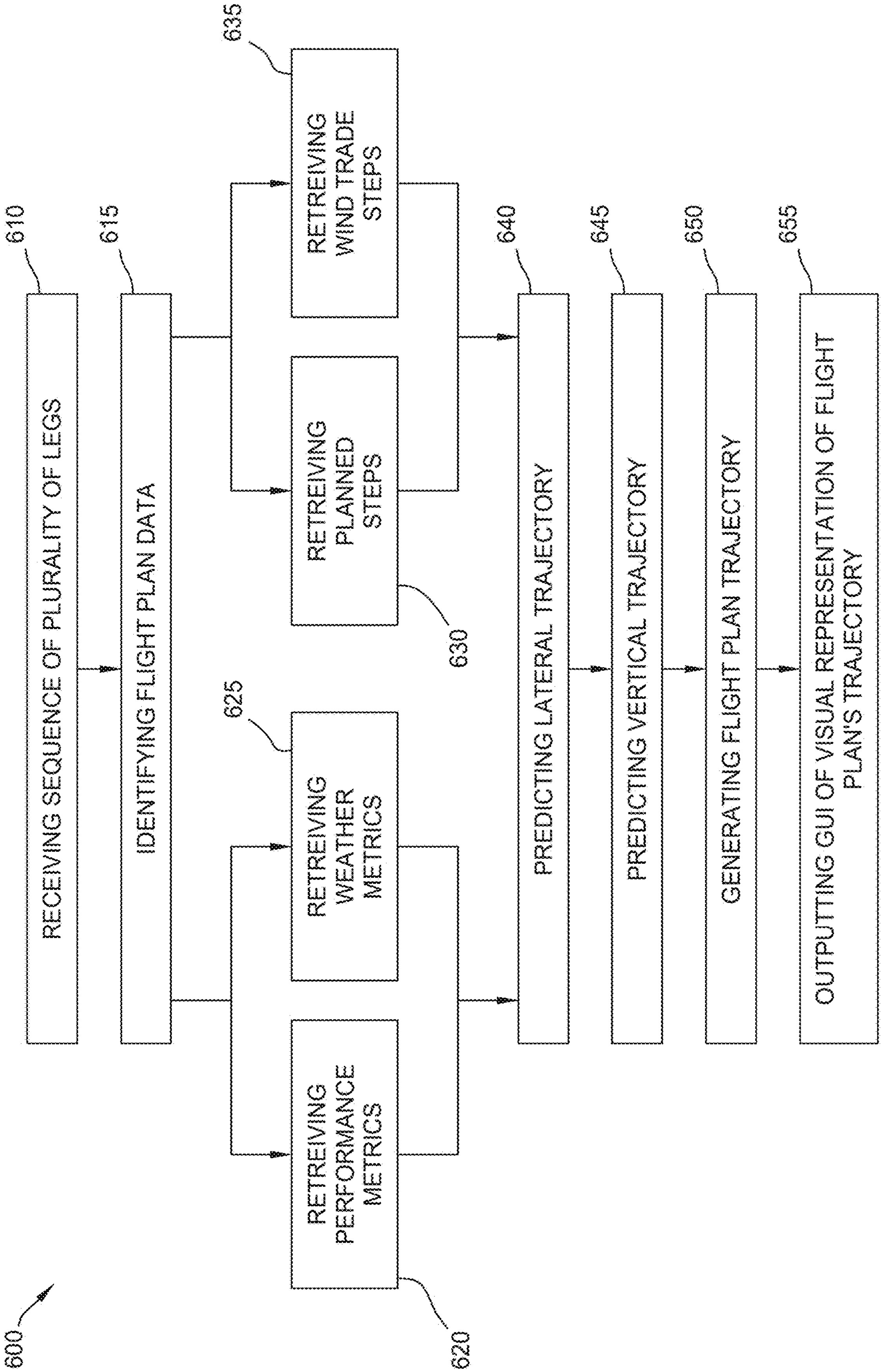
FIG. 6 depicts a flowchart for predicting lateral and vertical trajectories.

FIG. 6 illustrates the flowchart 600, of outputting a flight plan after receiving a sequence of a plurality of legs that define the flight plan. For example, the flowchart 600 may start after block 210 in FIG. 2 (or after the flowchart 300 in FIG. 3) has been completed.

At block 610, the FMS receives the sequence of the plurality of legs 190—e.g., using the flowchart 300 in FIG. 3.

At block 615, the FMS identifies flight plan data which can include route information, performance data, specifications of the aircraft, weather information, notices given to the airmen, air traffic control information, fuel planning, and weight/balance information, among others. Route information can include the information pertaining to the legs entered into the flight plan such as destination airports, the origin airport, airways that will be used, SIDs, STARs, etc. Performance data can include information such as planned cruising altitude, airspeed, fuel consumption rates, estimated time en route, etc. Aircraft specification data includes but is not limited to details about the aircraft such as registration number, equipment capabilities, or any planned route procedures. Weather information includes forecast wind and temperature conditions along the planned route. Air traffic control information can include air traffic control instructions, clearances, issues, etc. Fuel planning information includes calculations and considerations related to fuel reserves, fuel loads, and planning for unforeseen circumstances. Weight and balance data includes information about the distribution of passengers, cargo and fuel.

At blocks 620, 625, 630 and 635, flight plan data is retrieved for predicting the lateral trajectory and the vertical trajectory of the flight plan. At block 620, the FMS 110 retrieves performance metrics data and at block 625 the FMS 110 retrieves weather metrics. Both blocks 625 and 620 are used for predicting lateral trajectory. At block 640, the lateral trajectory is predicted.

In one aspect, predicting the lateral trajectory of an aircraft is done using navigation systems that update the FMS 110 with information regarding the aircraft's position, heading and track over ground. The weather data retrieved by the FMS 110 at block 625 is also used. Weather data such as forecasts and observations, wind speed, direction, and turbulence are also considered by the FMS when predicting lateral trajectory. Integrating data regarding performance metrics and weather data helps predict the lateral trajectory.

At block 630 the FMS retrieves data regarding planned steps, and at block 635 the FMS computes data regarding wind trade steps. Wind trade steps are altitude increments used in flight planning to optimize aircraft performance by leveraging varying wind conditions at different flight levels. By dividing the flight into segments using these increments, the flight plan can be configured using analyzations of possible speed and direction at each altitude, enabling an efficient flight plan to be built. Minimizing fuel consumption, minimizing flight time and other improvements may be a result of taking advantage of favorable winds and avoiding adverse conditions. At block 645 flight planning and wind trade step data are considered and used to predict the vertical trajectory of the aircraft.

At block 650 the FMS uses the above information and generates a flight plan's final trajectory. The FMS 110 receives information at the CDU 120 (manually or uplined). Additional information within the FMS system such as information regarding waypoints, airways, and departure/arrival procedures may also be used. This information, including information gathered and used to make internal calculations from previous steps (such as lateral trajectory prediction and vertical trajectory prediction) is used to generate a flight plan. The generated flight plan may be reviewed and finalized. The flight plan may a three-dimensional flight plan in space generated using the data presented above, including the origin point, the destination point, the lateral trajectory and the vertical trajectory (which is computed based on the predicted lateral trajectory). The flight plan may also be a four-dimensional flight plan in time and space generated using the data presented above such as the origin point, the destination point, the lateral trajectory, the vertical trajectory, and time data.

At block 655, the FMS 110 outputs a GUI of a visual representation of the flight plan's final trajectory at the CDU 120. The GUI interface displays a map display that shows the planned route. The GUI visual representation of the flight plan provides a clear and intuitive way of visualizing the planned route. The GUI display may receive updates from the FMS and change as the flight plan changes. Updates and recalculations can also occur when the aircraft flies the predicted trajectory. For example, the actual wind speed may be different than the predicted wind speed, the actual fuel burn may be less or more than the predicted fuel burn, among other things, making cause for a recalculation. The GUI display may also include interactive features that allow zooming in or out, panning across the map, or selecting certain segments of the flight to be prompted with further details pertaining to that segment. The GUI is a representation of the three dimensional or four dimensional flight plans.

Figure 7:
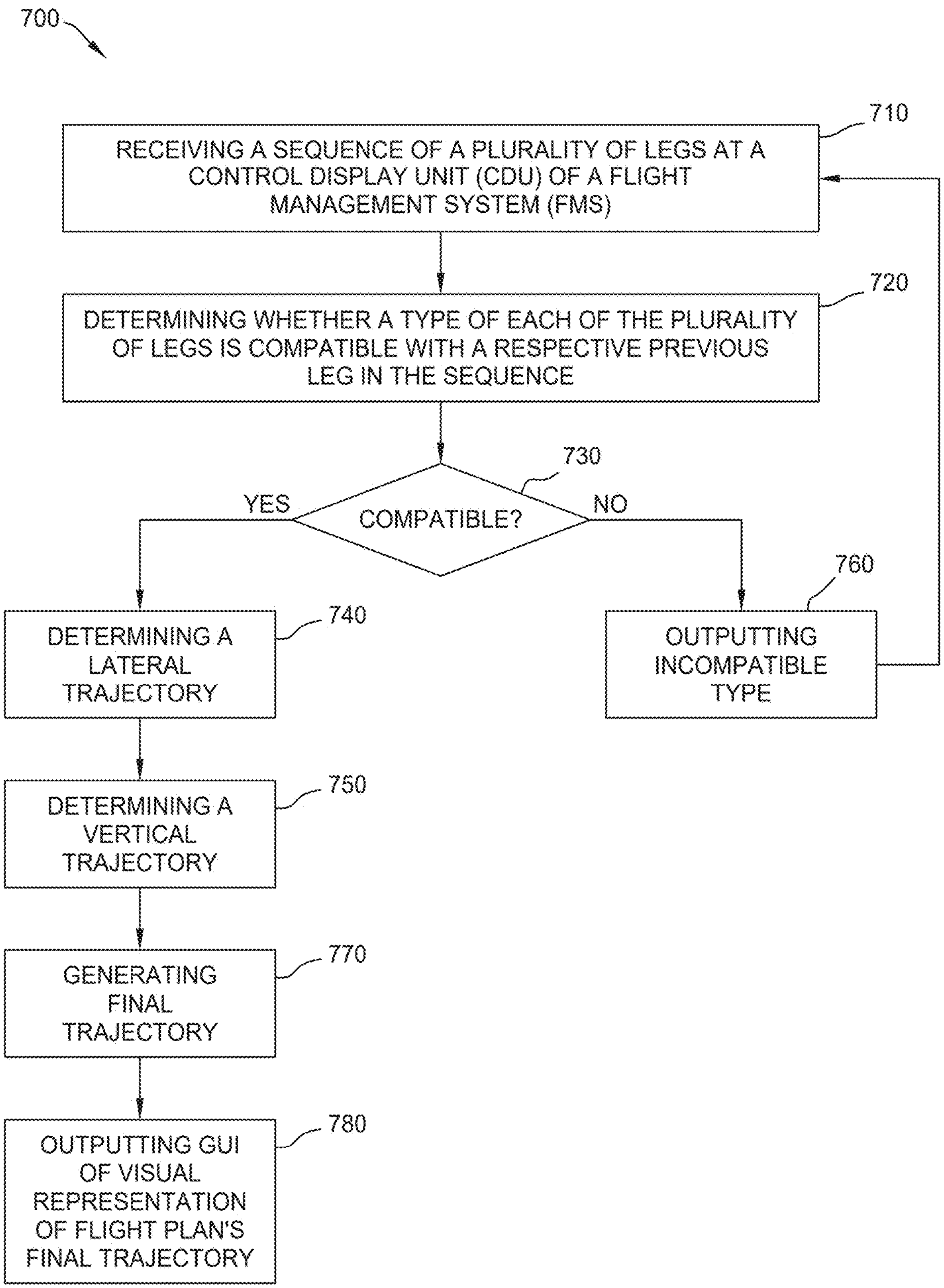
FIG. 7 depicts a flowchart for outputting a graphical user interface (GUI) visual representation of a flight plan.

FIG. 7 depicts a flowchart of the process of outputting a GUI of a visual representation of a flight plan's final trajectory from start to finish.

At block 710, the FMS 110 receives a sequence of a plurality of legs 190 at a CDU 120. The sequence of plurality of legs 190 are inputted using the I/O elements 130, enabling a user to communicate with the FMS 110. This was described at block 210 in FIG. 2 and block 310 of FIG. 3. At block 720, the plurality of legs are verified as compatible to fit within the sequence that defines the flight plan. This has been discussed in more detail in FIG. 3. At block 730, the compatibility is checked and if the sequence is valid, the flow moves to block 740 and then block 750. If the sequence is invalid, the flow moves to block 760. At block 760, the FMS outputs at the CDU that there are incompatible legs in the sequence. This compatibility check was described in FIG. 3 and FIG. 5. At block 740, the lateral trajectory of the aircraft in the flight plan is determined by the FMS, and at block 750 the vertical trajectory of the aircraft in the flight plan is determined by the FMS. At block 770 the flight plan's final trajectory is generated by the FMS and at block 780 the generated final trajectory of the flight plan is outputted as a GUI by the FMS. These processes were also discussed in FIG. 6.

What is claimed is:

1. A method, comprising:

receiving, at a control display unit (CDU) of a flight management system (FMS), a sequence of a plurality of legs for a flight plan for a flight, wherein the sequence of the plurality of legs includes a first leg and a second leg in the sequence;

determining whether a type of each of the plurality of legs is compatible with a type of a respective previous leg in the sequence, wherein determining whether a type of each of the plurality of legs is compatible with a type of a respective previous leg in the sequence comprises:

prompting, at the CDU, a request for additional second leg information to define the second leg, receiving, at the CDU, the additional second leg information, and determining whether the second leg is compatible with the first leg in the sequence based on using the additional second leg information to retrieve compatibility information from a matrix stored in the FMS;

responsive to determining the plurality of legs in the sequence is compatible:

determining a lateral trajectory based on the sequence;

determining a vertical trajectory based on the sequence;

generating a final trajectory of the flight plan based on the lateral trajectory and the vertical trajectory;

outputting, at the CDU, a graphical user interface (GUI) comprising a visual representation of the final trajectory;

receiving real-time information regarding the flight; and adjusting the final trajectory of the flight plan based on the real-time information.

2. The method of claim 1, wherein receiving the sequence of the plurality of legs comprises:
receiving information defining the first leg at the CDU;
after receiving the first leg, receiving information defining the second leg, at the CDU; and
wherein determining whether each of the plurality of legs is compatible with the respective previous leg in the sequence comprises:
determining whether a type of the second leg is compatible with a type of the first leg, and
identifying information from the first leg that can be used to define the second leg.

3. The method of claim 2, wherein receiving the sequence of the plurality of legs further comprises:
after receiving information defining the first leg and the second leg, receiving information defining a third leg for the flight plan, at the CDU; wherein determining whether each of the plurality of legs is compatible with the respective previous leg of the sequence comprises:
determining whether a type of the third leg is compatible with a type of the second leg;
identifying information from the second leg that can be used to define the third leg;
upon determining more information is needed to define the third leg, outputting, at the CDU, a request for the needed information; and
receiving, at the CDU, the needed information.

4. The method of claim 1, wherein
the matrix stores a transition type value at an intersection between the type of the second leg and the type of the first leg,
wherein the transition type value indicates whether the second leg is permitted after the first leg.

5. The method of claim 1, wherein information used from the first leg to define the second leg comprises:
an end fix of the first leg defining a beginning fix of the second leg, and course headings.

6. The method of claim 1, wherein the final trajectory is a three-dimensional trajectory in space generated using an origin point, a destination point, the lateral trajectory and the vertical trajectory.

7. The method of claim 1, wherein the final trajectory is a four-dimensional trajectory in time and space generated using an origin point, a destination point, the lateral trajectory, the vertical trajectory, and time data.

8. A system comprising:
a control display unit (CDU) of a flight management system (FMS), configured to:
receive a sequence of a plurality of legs for a flight plan for a flight,
wherein the sequence of the plurality of legs includes a first leg and a second leg;
prompt a request for additional second leg information to define the second leg; and
receive the additional second leg information; and
a flight management computer (FMC) configured to:
obtain compatibility information from a matrix stored in the FMS based on the additional second leg information;
determine whether a type of each of the plurality of legs is compatible with a type of a respective previous leg in the sequence based on the compatibility information; and
responsive to determining the plurality of legs in the sequence is compatible:
determine a lateral trajectory based on the sequence;
determine a vertical trajectory based on the sequence; and
generate a final trajectory of the flight plan based on the lateral trajectory and the vertical trajectory,
wherein the CDU is further configured to output a graphical user interface (GUI) comprising a visual representation of the final trajectory.

9. The system of claim 8, wherein receiving a sequence of a plurality of legs comprises:
receiving information defining the first leg for the flight plan, at the CDU;
after receiving the first leg, receiving information defining the second leg for the flight plan, at the CDU; and
wherein determining whether each of the plurality of legs is compatible with the respective previous leg in the sequence comprises:
determining whether a type of the second leg is compatible with a type of the first leg, and
identifying information from the first leg that can be used to define the second leg.

10. The system of claim 9, wherein receiving a sequence of a plurality of legs further comprises:
after receiving information defining the first leg and the second leg, receiving information defining a third leg for the flight plan, at the CDU;
wherein determining whether each of the plurality of legs is compatible with the respective previous leg the sequence comprises:
determining whether a type of the third leg is compatible with a type of the second leg;
identifying information from the second leg that can be used to define the third leg;
upon determining more information is needed to define the third leg, outputting, at the CDU, a request for the needed information; and
receiving, at the CDU, the needed information.

11. The system of claim 8, wherein the matrix storing matrix stores a transition type value at an intersection between the type of the second leg and the type of the first leg, wherein the transition type value indicates whether the second leg is permitted after the first leg.

12. The system of claim 9, wherein information used from the first leg to define the second leg comprises:
an end fix of the first leg defining a beginning fix of the second leg, and course headings.

13. The system of claim 8, wherein the final trajectory is a three-dimensional trajectory in space generated using an origin point, a destination point, the lateral trajectory and the vertical trajectory.

14. The system of claim 8, wherein the final trajectory is a four-dimensional trajectory in time and space generated using an origin point, a destination point, the lateral trajectory, the vertical trajectory, and time data.

15. A non-transitory computer-readable storage medium having computer-readable program code embodied therewith, the computer-readable program code executable by one or more computer processors to:
receive, at a control display unit (CDU) of a flight management system (FMS), a sequence of a plurality of legs for a flight plan for a flight,
wherein the sequence of the plurality of legs includes a first leg and a second leg in the sequence;
determine whether a type of each of the plurality of legs is compatible with a type of a respective previous leg in the sequence, wherein the one or more computer processors, to determine whether a type of each of the plurality of legs is compatible with a type of a respective previous leg in the sequence, are to:

prompt, at the CDU, a request for additional second leg information to define the second leg, receive, at the CDU, the additional second leg information, and determine whether the second leg is compatible with the first leg in the sequence based on using the additional second leg information to retrieve compatibility information from a matrix stored in the FMS;

responsive to determining the plurality of legs in the sequence is compatible:

determine a lateral trajectory based on the sequence;

determine a vertical trajectory based on the sequence;

generate a final trajectory of the flight plan based on the lateral trajectory and the vertical trajectory; and transmit for display, at the CDU, a graphical user interface (GUI) comprising a visual representation of the final trajectory.

16. The non-transitory computer-readable storage medium of claim 15, wherein the one or more computer processors, to receive a sequence of a plurality of legs, are to:

receive information defining a first leg for the flight plan, at the CDU;

after receiving the first leg, receive information defining a second leg for the flight plan, at the CDU; and wherein the one or more processors, to determine whether each of the plurality of legs is compatible with the respective previous leg in the sequence, are to:

determine whether a type of the second leg is compatible with a type of the first leg, and identify information from the first leg that can be used to define the second leg.

17. The non-transitory computer-readable storage medium of claim 16, wherein the one or more processors, to receive a sequence of a plurality of legs, are to:

after receiving information defining the first leg and the second leg, receive information defining a third leg for the flight plan, at the CDU;

wherein the one or more processors, to determine whether each of the plurality of legs is compatible with the respective previous leg the sequence, are to:

determine whether a type of the third leg is compatible with a type of the second leg;

identify information from the second leg that can be used to define the third leg;

upon determining more information is needed to define the third leg, output, at the CDU, a request for the needed information; and receive, at the CDU, the needed information.

18. The non-transitory computer-readable storage medium of claim 16, wherein the matrix stores a transition type value at an intersection between the type of the second leg and the type of the first leg, wherein the transition type value indicates whether the second leg is permitted after the first leg.

19. The non-transitory computer-readable storage medium of claim 16, wherein information used from the first leg to define the second leg comprises:

an end fix of the first leg defining a beginning fix of the second leg, and course headings.

20. The non-transitory computer-readable storage medium of claim 15, wherein the final trajectory is a three-dimensional trajectory in space generated using an origin point, a destination point, the lateral trajectory and the vertical trajectory.

* * * * *